US009525344B2

(12) United States Patent
Chen

(10) Patent No.: US 9,525,344 B2
(45) Date of Patent: *Dec. 20, 2016

(54) CONSTANT TIME CONTROLLER AND CONTROLLING METHOD FOR A SWITCHING REGULATOR

(71) Applicant: Silergy Semiconductor Technology (Hangzhou) LTD, Hangzhou, ZheJiang Province (CN)

(72) Inventor: Wei Chen, Saratoga, CA (US)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 217 days.

This patent is subject to a terminal disclaimer.

(21) Appl. No.: 14/095,493

(22) Filed: Dec. 3, 2013

(65) Prior Publication Data

US 2014/0091778 A1 Apr. 3, 2014

Related U.S. Application Data

(63) Continuation of application No. 13/610,524, filed on Sep. 11, 2012, now Pat. No. 8,659,282.

(30) Foreign Application Priority Data

Sep. 14, 2011 (CN) .......................... 2011 1 0289650

(51) Int. Cl.
*H02M 3/157* (2006.01)
*H02M 3/156* (2006.01)
*G05F 1/571* (2006.01)
*G05F 1/573* (2006.01)

(52) U.S. Cl.
CPC ............. *H02M 3/157* (2013.01); *H02M 3/156* (2013.01); *H02M 2003/1566* (2013.01)

(58) Field of Classification Search
CPC .................. H02M 3/156; H02M 3/157; H02M 2001/0003; H02M 2001/0019; H02M 2003/1566; H02M 3/1588; G05F 1/573
USPC .......................... 323/282, 283, 284, 285, 351
See application file for complete search history.

(56) References Cited

U.S. PATENT DOCUMENTS

| 6,348,780 | B1 * | 2/2002 | Grant | ..................... H02M 3/156 |
| | | | | 323/222 |
| 6,456,050 | B1 * | 9/2002 | Agiman | .............. H02M 3/1563 |
| | | | | 323/282 |
| 7,583,128 | B1 | 9/2009 | Batarseh | |
| 7,647,125 | B2 * | 1/2010 | Melanson | .............. G05B 11/28 |
| | | | | 307/141 |

(Continued)

*Primary Examiner* — Gary L Laxton
(74) *Attorney, Agent, or Firm* — Michael C. Stephens, Jr.

(57) ABSTRACT

In one embodiment, a controlling method for a switching regulator, can include: (i) detecting an output voltage and an inductor current of the switching regulator; (ii) determining if there is a transient change on a load of the switching regulator by using the output voltage and a first reference voltage; (iii) generating a control signal using the output voltage, the inductor current, and a second reference voltage; (iv) controlling a switch of the switching regulator to maintain the output voltage substantially constant when no transient change is determined on the load; and (v) deactivating the control signal to keep the inductor current changing along with a variation tendency of an output current of the switching regulator when a transient change is determined on the load.

20 Claims, 7 Drawing Sheets

(56) References Cited

U.S. PATENT DOCUMENTS

| | | | | |
|---|---|---|---|---|
| 7,834,606 B2* | 11/2010 | Liu | ............... | H02M 3/157 |
| | | | | 323/283 |
| 8,575,911 B2* | 11/2013 | Cheng | ............... | H02M 1/14 |
| | | | | 323/283 |
| 2004/0178785 A1* | 9/2004 | Sutardja | ............... | H02M 1/088 |
| | | | | 323/283 |
| 2008/0030181 A1 | 2/2008 | Liu | | |
| 2011/0304308 A1 | 12/2011 | Wan et al. | | |

* cited by examiner

CONSTANT TIME CONTROLLER AND CONTROLLING METHOD FOR A SWITCHING REGULATOR

RELATED APPLICATIONS

This application is a continuation of the following application, U.S. patent application Ser. No. 13/610,524, filed on Sep. 11, 2012, now issued as U.S. Pat. No. 8,659,282, and which is hereby incorporated by reference as if it is set forth in full in this specification, and which also claims the benefit of Chinese Patent Application No. 201110289650.9, filed on Sep. 14, 2011, which is incorporated herein by reference in its entirety.

FIELD OF THE INVENTION

The present invention relates to the field of power supplies, and more specifically to a constant time controller, controlling method thereof, and a switching regulator.

BACKGROUND

A switched-mode power supply (SMPS) typically includes a power stage circuit and a controller. The controller may be used to regulate the conduction and shutdown times of the switches in the power stage circuit. This may be done regardless of variation in input voltage, inside parameters, and load, in order to keep the output voltage or output current of the SMPS substantially constant. Therefore, it is important to choose a proper controlling method, and to design a proper controller for the SMPS, as different performance may result from different controlling methods and/or controllers.

SUMMARY

In one embodiment, a controlling method for a switching regulator, can include: (i) detecting an output voltage and an inductor current of the switching regulator; (ii) determining if there is a transient change on a load of the switching regulator by using the output voltage and a first reference voltage; (iii) generating a control signal using the output voltage, the inductor current, and a second reference voltage; (iv) controlling a switch of the switching regulator to maintain the output voltage substantially constant when no transient change is determined on the load; and (v) deactivating the control signal to keep the inductor current changing along with a variation tendency of an output current of the switching regulator when a transient change is determined on the load.

In one embodiment, controller for a switching regulator, can include: (i) a control signal configured to be generated in accordance with an output voltage and an inductor current of the switching regulator, where the control signal is a pulse signal having a constant time, the control signal being configured to control a switch of the switching regulator; (ii) a transient controller configured to determine if there is a transient change on a load of the switching regulator by using the output voltage and a first reference voltage; (iii) where when there is no transient change on the load, the switch is controlled by the control signal maintain the output voltage substantially constant; and (iv) where when there is a transient change on the load, the transient controller is configured to generate a transient control signal to control deactivation of the control signal earlier than when in a normal state, where the inductor current is configured to change consistently with a variation tendency of an output current of the switching regulator.

In one embodiment, a switching generator can include: (i) a controller, as above; (ii) a power stage circuit configured to receive an input voltage; and (iii) a driver coupled to the power stage circuit and the constant time controller, the driver being configured to receive the control signal, and to generate a drive signal to control a switch of the power stage.

Embodiments of the present invention can advantageously provide several advantages over conventional approaches. For example, the response speed on transient change of the switching regulator is improved to avoid superimposing a large ripple on the output voltage, as well as maintaining the converter in a steady state. Other advantages of the present invention may become readily apparent from the detailed description of preferred embodiments below.

DETAILED DESCRIPTION

Figure 1A:
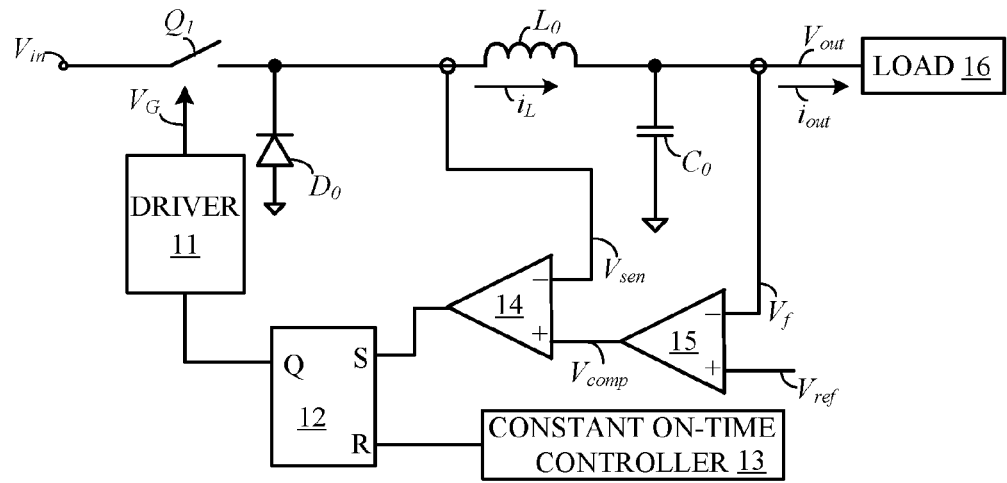
FIG. 1A is the block diagram of an example DC-DC converter with constant on-time control.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on data streams, signals, or waveforms within a computer, processor, controller, device and/or memory. These descriptions and representations are generally used by those skilled in the data processing arts to actively convey the substance of their work to others skilled in the art. Usually, though not necessarily, quantities being manipulated take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

Furthermore, in the context of this application, the terms "wire," "wiring," "line," "signal," "conductor," and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Embodiments of the present invention can advantageously provide several advantages over conventional approaches. Particular embodiments can provide a constant time controller, controlling method thereof, and a switching regulator. For example, the constant time controller and controlling method can measure the transient change on the load in real-time, and when the load changes suddenly, the constant time can be quickly regulated to achieve fast transient response. In this way, the response speed on transient change of the switching regulator is improved to avoid superimposing a large ripple on the output voltage, as well as maintaining the converter in a steady state. The invention, in its various aspects, may be explained in greater detail below with regard to exemplary embodiments.

In one controlling method for switched-mode power supply (SMPS) can include constant-frequency control and variable-frequency control. In constant-frequency control, the switch cycle may be constant, while the conduction time or the shutdown time of the switches may be variable. In variable-frequency control, the conduction time or the shutdown time of the switches may be constant while the switch cycle may be variable.

In some applications, constant-frequency control can be relatively easy to achieve with low product cost. However, the transient response of constant-frequency control for variable load may be too slow to recover to a normal operation or state in a relatively short time. In other applications, constant-frequency control can be divided into constant on-time control and constant off-time control.

Figure 1B:
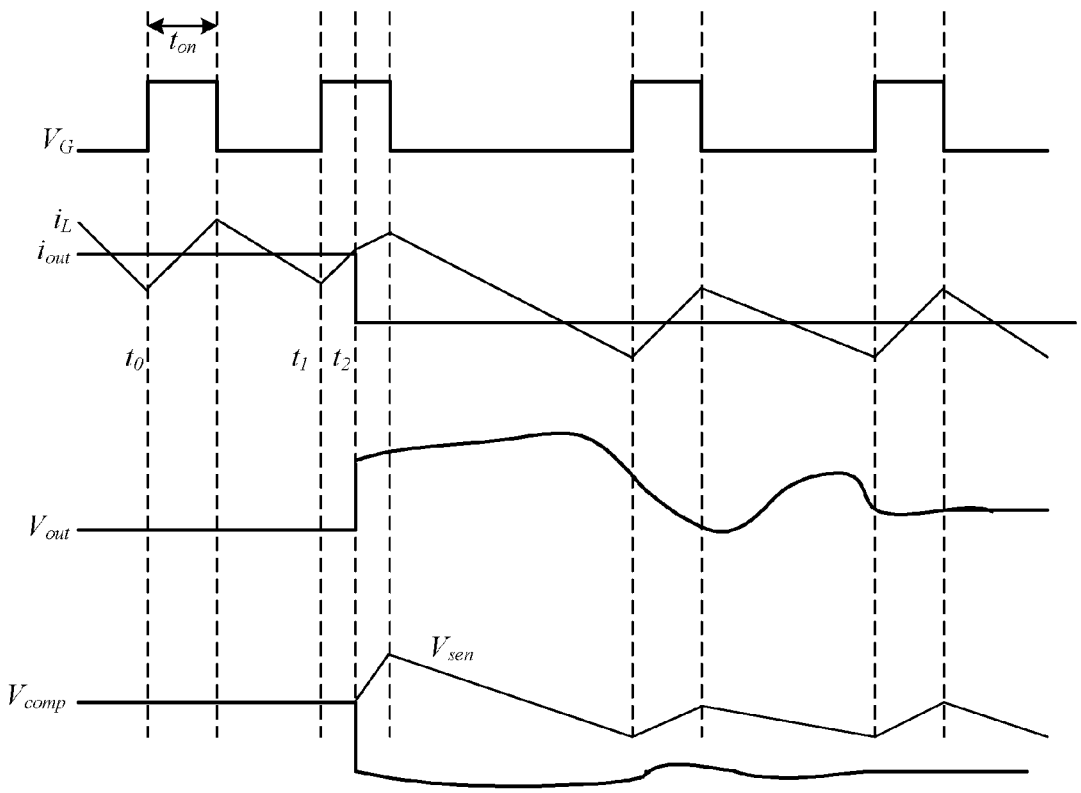
FIG. 1B is a waveform diagram of example operation of the DC-DC converter shown in FIG. 1A.

With reference to FIG. 1A, an example DC-DC converter of constant on-time control is shown. In this example, switch $Q_1$, diode $D_0$, inductor $L_0$, and capacitor $C_0$ can form a buck topology for receiving an input voltage $V_{in}$ at the input terminal, and generating a substantially constant output voltage $V_{out}$ to load 16. Combined with FIG. 1B, which shows example operation waveforms of the DC-DC converter shown in FIG. 1A, an example operation process will be described.

During the period from time $t_0$ to time $t_1$, the DC-DC converter may be working in normal state. Here, a double closed-loop control system may be set up by operational amplifier 15 generating an error signal voltage $V_{comp}$ by comparing reference voltage $V_{ref}$ against feedback voltage $V_f$ of output voltage $V_{out}$ and a comparator generating a set signal by comparing an inductor current sense signal $V_{sen}$ against error voltage signal $V_{comp}$. When a low portion or valley of inductor current sense signal $V_{sen}$ reaches error voltage signal $V_{comp}$, terminal S of RS flip-flop 12 may be activated, which can cause output terminal Q to be activated to turn on switch $Q_1$. After switch $Q_1$ is turned on for a constant on-time $t_{on}$, which is controlled by a constant on-time controller 13, reset terminal R of RS flip-flop 12 may be activated to cause output terminal Q to deactivate to turn off switch $Q_1$. This example operation process can be repeated to achieve substantially constant on-time control, and to keep output voltage $V_{out}$ substantially constant.

If load 16 suffers from a sudden change (e.g., a change from a relatively heavy load to a relatively light load) during constant on-time $t_{on}$, such as at time $t_2$, output current $i_{out}$ can drop suddenly. However, switch $Q_1$ may remain in conduction at the same time because of constant on-time control. As such, inductor current $i_L$ may continue to increase until constant on-time $t_{on}$ is over. The difference between inductor current $i_L$ and output current $i_{out}$ in this case may therefore becoming larger and larger. Similarly, output voltage $V_{out}$ may rise suddenly at time $t_2$ and keep rising during constant on-time $t_{on}$, which can finally cause a large ripple on output voltage $V_{out}$. The DC-DC converter may recover to a normal operation or state to meet a substantially constant output voltage for load 16 after a relatively long regulating time.

One drawback of the example DC-DC converter of FIG. 1A is that the transient response to the transient change of load is relatively slow and an over-shoot may be generated on the output voltage, which can do harm to the components of the DC-DC converter. In particular embodiments, the response speed on transient change of the switching regulator may be improved to avoid superimposing a large ripple on the output voltage, as well as by maintaining the converter in a steady state.

In one embodiment, a controlling method for a switching regulator, can include: (i) detecting an output voltage and an inductor current of the switching regulator; (ii) determining if there is a transient change on a load of the switching regulator by using the output voltage and a first reference voltage; (iii) generating a control signal using the output voltage, the inductor current, and a second reference voltage; (iv) controlling a switch of the switching regulator to maintain the output voltage substantially constant when no transient change is determined on the load; and (v) deactivating the control signal to keep the inductor current changing along with a variation tendency of an output current of the switching regulator when a transient change is determined on the load.

In one embodiment, controller for a switching regulator, can include: (i) a control signal configured to be generated in accordance with an output voltage and an inductor current of the switching regulator, where the control signal is a pulse signal having a constant time, the control signal being configured to control a switch of the switching regulator; (ii) a transient controller configured to determine if there is a transient change on a load of the switching regulator by using the output voltage and a first reference voltage; (iii) where when there is no transient change on the load, the switch is controlled by the control signal maintain the output voltage substantially constant; and (iv) where when there is a transient change on the load, the transient controller is configured to generate a transient control signal to control deactivation of the control signal earlier than when in a normal state, where the inductor current is configured to change consistently with a variation tendency of an output current of the switching regulator.

In one embodiment, a switching generator can include: (i) a controller, as above; (ii) a power stage circuit configured to receive an input voltage; and (iii) a driver coupled to the power stage circuit and the constant time controller, the driver being configured to receive the control signal, and to generate a drive signal to control a switch of the power stage.

Figure 2:
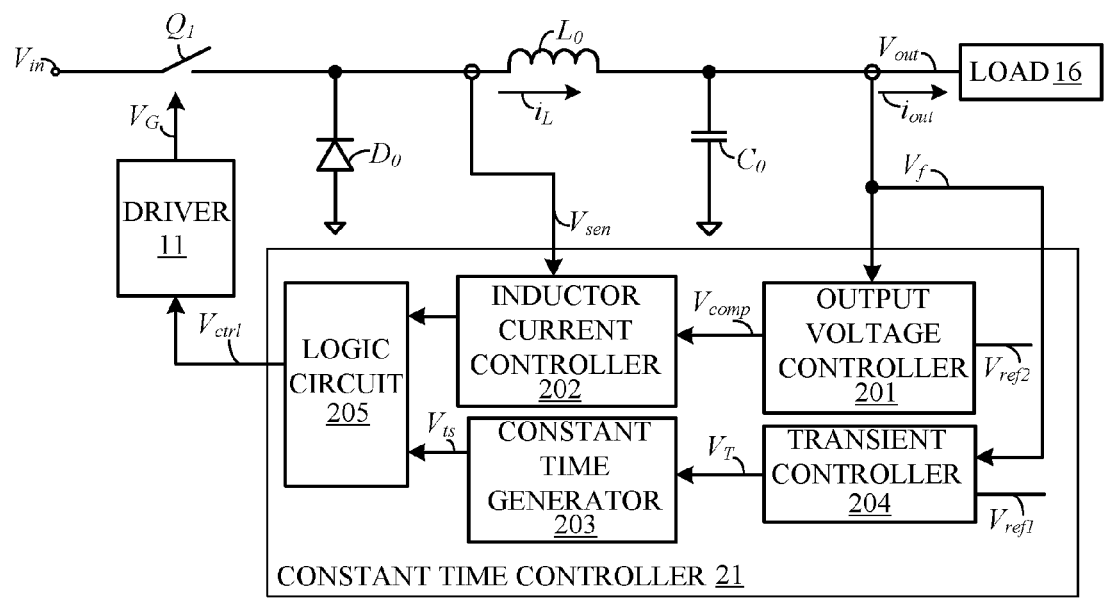
FIG. 2 is a block diagram of an example constant time controller for a switching regulator in accordance with embodiments of the present invention.

With reference to FIG. 2, shown is a block diagram of an example constant time controller for a switching regulator in accordance with embodiments of the present invention. In this example switching regulator of a buck topology can include switch $Q_1$, diode $D_0$, inductor $L_0$, and output capacitor $C_0$ forming a power stage for receiving input voltage $V_{in}$ at the input terminal and generating a power supply for load 16 at the output terminal.

Constant time controller 21 can include transient controller 204 used to measure the transient change of load 16 by comparing a feedback voltage $V_f$ against first reference voltage $V_{ref1}$, and to generate transient control signal $V_T$ for setting a control signal $V_{ctrl}$ to be active earlier than in a normal operation state. Output voltage controller 201 can generate an error voltage signal $V_{comp}$ by comparing feedback voltage $V_f$ against second reference voltage $V_{ref2}$. Inductor current controller 202 can compare inductor current sense signal $V_{sen}$ against error voltage signal $V_{comp}$, which can be used as reference signal for inductor current sense signal $V_{sen}$. Constant time generator 203 may be used to receive transient control signal $V_T$, and logic circuit 205 can connect with output terminals of inductor current controller 202 and constant time generator 203 to generate control signal $V_{ctrl}$.

When load 16 is substantially stable in a normal state, constant time generator 203 can generate a constant time signal Vts regularly. However, when load 16 changes suddenly, transient controller 204 can generate constant time signal Vts earlier than when in a normal operation or state for setting control signal $V_{ctrl}$ to be deactivated earlier. In a normal state, constant time controller 21 can generate control signal $V_{ctrl}$ for controlling the switching operation of switch $Q_1$ in accordance with inductor current sense signal $V_{sen}$ and feedback voltage $V_f$.

When output voltage $V_{out}$ changes suddenly due to transient change on load 16, transient control signal $V_T$ can be generated by transient controller 204 to set control signal $V_{ctrl}$ to be deactivated earlier. This can control the operation of switch $Q_1$ and keep inductor current $i_L$ changing in accordance with a variation tendency of output current $i_{out}$. In this way, the fast transient response may therefore be realized.

Constant time control can be divided into constant on-time control and constant off-time control. For constant on-time control, if output voltage $V_{out}$ is greater than the first reference voltage $V_{ref1}$, during a conduction period of switch $Q_1$, load 16 may drop from a relatively heavy load to a relatively light load suddenly. In this case, transient controller 204 can control constant time generator 203 to output constant time signal Vts earlier than in a normal state for setting control signal $V_{ctrl}$ to be inactive and to turn off switch $Q_1$ earlier. Also, inductor current $i_L$ may thus begin to decrease consistently with the variation tendency of output current $i_{out}$.

For constant off-time control, if output voltage $V_{out}$ is less than first reference voltage $V_{ref1}$ during a shutoff period of switch $Q_1$. Thus, if load 16 rises from a substantially light load to a substantially heavy load suddenly, transient controller 204 can control constant time generator 203 to output constant time signal Vts earlier than in normal operation or state for deactivating control signal $V_{ctrl}$ and turning on switch $Q_1$ earlier. Thus, inductor current $i_L$ may consequently begin to increase consistently with variation tendency of output current $i_{out}$.

In this example of FIG. 2, the constant time controller can deactivate the control signal earlier than in normal state when the load suffered from a transient change. This can maintain the inductor current changing in accordance with the variation tendency of the output current, and therefore improve the transient response speed, as well as to decrease the ripple of output voltage and the recovery time.

As one skilled in the art will recognize, the power stage may be implemented by any appropriate topology, such as buck topology, boost topology, buck-boost topology, or other isolated topologies. Also, constant time controller 21 may be implemented by any appropriate circuit which can realize the function of generating a control signal. Also, output voltage controller 201, inductor current controller 202, constant time generator 203, and logic circuit 205 can be implemented by different circuits, and/or may have different connection arrangements. Output voltage controller 201 may further include voltage-dividing resistors to obtain a feedback voltage of output voltage. Inductor current controller 202 may also include a current-voltage converter for converting an inductor current signal to a voltage signal.

Figure 3A:
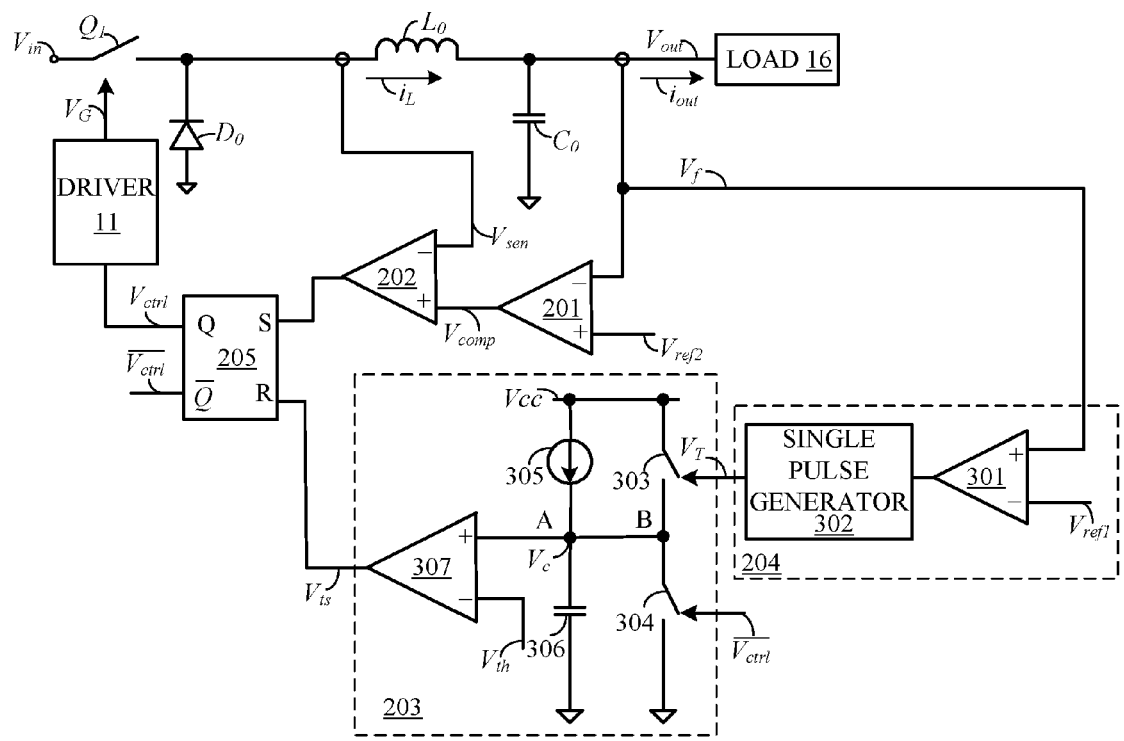
FIG. 3A is a block diagram of an example constant on-time controller for a switching regulator in accordance with embodiments of the present invention.
Figure 3B:
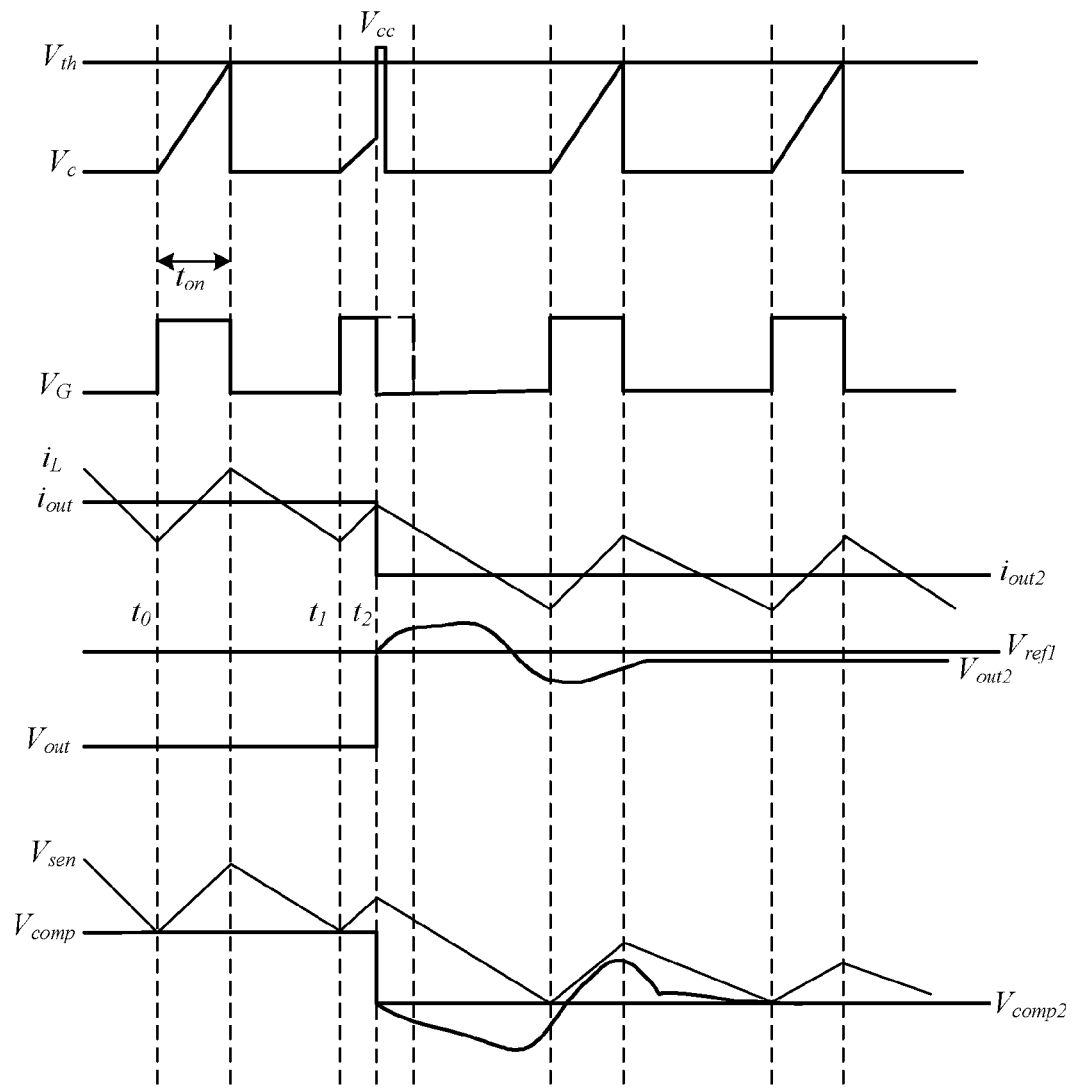
FIG. 3B is a waveform diagram showing example operation of the constant on-time controller shown in FIG. 3A.

FIG. 3A, which shows an example constant on-time controller for switching regulator in accordance with embodiments of the present invention, and FIG. 3B, which shows example operation waveforms of the constant on-time controller shown in FIG. 3A, may be viewed in combination for discussion of an example operation process as follows.

Output voltage controller 201 can include an error amplifier configured to receive feedback voltage $V_f$ at its inverting terminal, and the second reference voltage $V_{ref2}$ at its non-inverting terminal, and to generate error voltage signal $V_{comp}$ at its output terminal. Inductor current controller 202 can include a comparator that is configured to receive inductor current sense signal $V_{sen}$ at its inverting terminal, and error voltage signal $V_{comp}$ at its non-inverting terminal, and can connect to the set terminal S of a RS flip-flop.

Constant time generator 203 can include constant current source 305 connected in series with capacitor 306 between a voltage source $V_{cc}$ and the ground. First switch 303 can connect in series with a second switch 304 between voltage source $V_{cc}$ and ground. Common node A of constant current source 305 and capacitor 306 can be connected together with a common node B of first switch 303 and second switch 304. Second comparator 307 can connect with common node A and common node B at its non-inverting terminal, and with threshold voltage $V_{th}$ at its inverting terminal.

Transient controller 204 can include first comparator 301 and single pulse generator 302. First comparator 301 can receive feedback voltage $V_f$ at its non-inverting terminal and first reference voltage $V_{ref1}$ at its inverting terminal, and can connect to single pulse generator 302 at its output terminal. Single pulse generator 302 can generate a transient control signal $V_T$ for controlling first switch 303.

Logic circuit 205 can include an RS flip-flop which can connect to the output terminal of comparator 202 at its set terminal S, and to the output terminal of the second comparator 307 at its reset terminal R. The RS flip-flop can generate control signal $V_{ctrl}$ at its first output terminal Q for controlling switch $Q_1$, and an inverted control signal $\overline{Vctrl}$ at its second output terminal $\overline{Q}$ for controlling second switch 304.

During normal operation/state of time period from time $t_0$ to time $t_1$, when a low or valley value of inductor current sense signal $V_{sen}$ reaches voltage error signal $V_{comp}$, inductor current controller 202 can generate a signal to set terminal S of RS flip-flop for turning on switch $Q_1$. During the conduction period of switch $Q_1$, first switch 303 and second switch 304 may both be off, and constant current source 305 may be charging for capacitor 306 until the voltage $V_c$ on capacitor 306 reaches threshold voltage $V_{th}$. Here, the charging time of capacitor 306 may be $t_{on}$, and second comparator 307 can generate a signal to reset terminal R of RS flip-flop for turning off switch $Q_1$, and for turning on the second switch 304. When first switch 304 is turned on, capacitor 306 can be discharged relatively fast to zero, and the operation can be repeated when inductor current sense signal $V_{sen}$ reaches error signal voltage $V_{comp}$ again. In this way, constant on-time control for switch $Q_1$, may be realized.

When load 16 changes from a relatively heavy load to a relatively light load suddenly at time $t_2$, output current $i_{out}$ may also drop suddenly, and this can cause output voltage $V_{out}$ to rise suddenly to be higher than the first reference voltage $V_{ref1}$. Also, first comparator 301 can generate an effective signal to single pulse generator 302 by comparing feedback voltage $V_f$ of output voltage $V_{out}$ with first reference voltage $V_{ref1}$. Then, single pulse generator 302 can generate a transient control signal $V_T$ for turning on first switch 303. Also, the voltage $V_c$ on capacitor 306 may be pulled up to source voltage $V_{cc}$ immediately and higher than threshold voltage $V_{th}$. The second comparator 307 can generate a signal to reset terminal R of RS flip-flop for turning off switch $Q_1$. Inductor current $i_L$ may thereby begin to decrease in accordance with the variation tendency of output current $i_{out}$ to achieve fast transient response. The switching regulator can recover to a normal operating state after a short regulation time, error voltage signal $V_{comp}$ can be stable at a new error voltage signal $V_{comp2}$. Also, output current $i_{out}$ may be stable at a new output current $i_{out2}$ as well as output voltage $V_{out}$ be stable at a new output voltage $V_{out2}$.

Figure 4A:
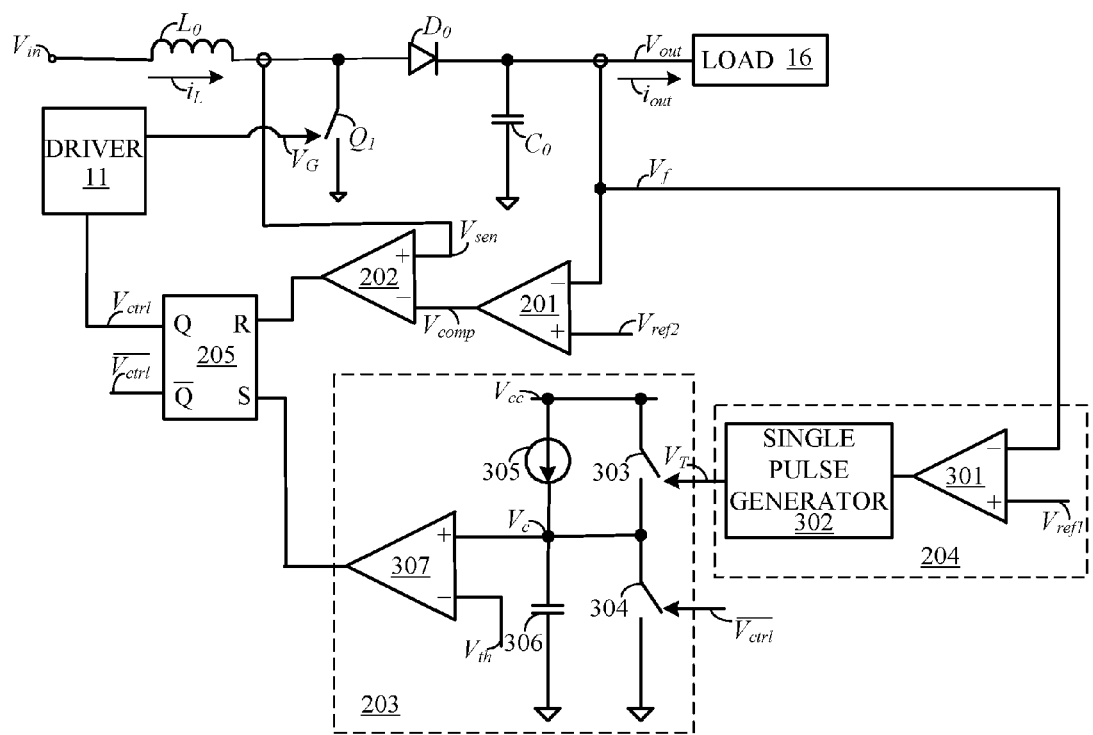
FIG. 4A is a block diagram of an example constant off-time controller for a switching regulator in accordance with embodiments of the present invention.

With reference to FIG. 4A, which shows an example constant off-time controller for switching regulator in accordance with embodiments of the present invention, and FIG. 4B which shows example operation waveforms of the constant off-time controller shown in FIG. 4A, the operation process can be described as follows. In this example, a switching regulator of a boost topology is utilized. However, other topologies (e.g., buck, buck-boost, etc.) can be used in particular embodiments.

In this example, switch $Q_1$, diode $D_0$, inductor $L_0$, and output capacitor $C_0$ can form the power stage of a boost topology for receiving input voltage $V_{in}$ at the input terminal and generating a power supply for load 16 at the output terminal. Inductor current controller 202 can receive inductor current sense signal $V_{sen}$ at its non-inverting terminal and error voltage signal $V_{comp}$ at its inverting terminal. Logic circuit 205 can include an RS flip-flop coupled to the output terminal of comparator 202 at its reset terminal R, and to the output terminal of second comparator 307 at its set terminal S. The RS flip-flop can generate control signal $V_{ctrl}$ at its first output terminal Q for controlling switch $Q_1$, and inverted control signal $\overline{Vctrl}$ at its second output terminal $\overline{Q}$ for controlling second switch 304.

Transient controller 204 can include first comparator 301 and single pulse generator 302. First comparator 301 can receive feedback voltage $V_f$ at its inverting terminal and first reference voltage $V_{ref1}$ at its non-inverting terminal. First comparator 301 can connect with single pulse generator 302 at its output terminal. Single pulse generator 302 can generate a transient control signal $V_T$ for controlling the first switch 303.

Figure 4B:
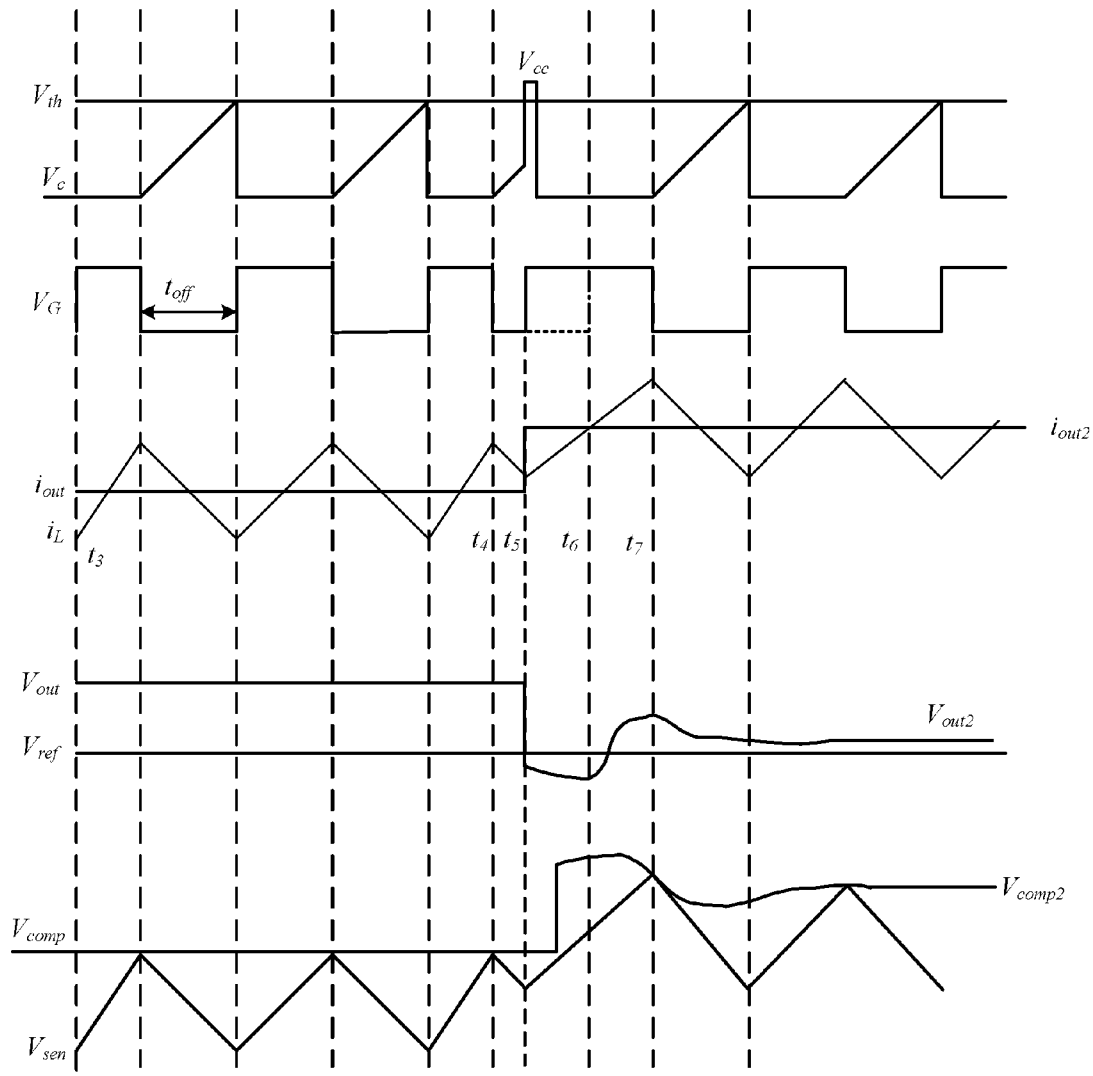
FIG. 4B is a waveform diagram showing example operation of the constant off-time controller shown in FIG. 4A.

During normal operation from time $t_3$ to time $t_4$, as shown in FIG. 4B, when output voltage $V_{out}$ is slightly differently from second reference voltage $V_{ref2}$, inductor current controller 202 can compare inductor current sense signal $V_{sen}$ with error voltage signal $V_{comp}$. When the or high peak value of inductor current sense signal $V_{sen}$ reaches error voltage signal $V_{comp}$, comparator 202 can generate or activate a signal to reset terminal R of the RS flip-flop for turning off switch $Q_1$. During the shutdown period of switch $Q_1$, first switch 303 and second switch 304 may both be off, and constant current source 305 may be charging capacitor 306 until voltage $V_c$ on capacitor 306 reaches threshold voltage $V_{th}$. Here, the charging time of capacitor 306 may be $t_{off}$, then second comparator 307 can generate or activate a signal to set terminal S of RS flip-flop 205 to turn on switch $Q_1$, and second switch 304. When first switch 304 is turned on, capacitor 306 can discharge relatively fast to zero, then the operation may be repeated when inductor current sense signal $V_{sen}$ reaches error voltage signal $V_{comp}$ again. In this way, constant off-time control for the switch may be realized.

When load 16 changes from a relatively light load to a relatively heavy load suddenly at time $t_5$, output current $i_{out}$ may also rise suddenly, and this can cause output voltage $V_{out}$ to drop suddenly to be lower than first reference voltage $V_{ref1}$. The first comparator 301 may activate a signal to single pulse generator 302 by comparing feedback voltage $V_f$ against first reference voltage $V_{ref1}$, then single pulse generator 302 may generate transient control signal $V_T$ for turning on first switch 303. The voltage on capacitor 306 may be pulled up to source voltage $V_{cc}$ immediately and higher than threshold voltage $V_{th}$. Also, the second comparator 307 can activate a signal to set terminal S of RS flip-flop for turning on switch $Q_1$. Inductor current $i_L$ may thereby start to increase in accordance with the variation tendency of output current $i_{out}$ to achieve a fast transient response. The switching regulator can recover to a normal operating state after a short time of regulating from time $t_5$ to time $t_7$. Also, error voltage signal $V_{comp}$ may be stabilized at a new error voltage signal $V_{comp2}$, and output current $i_{out}$ may be stabilized at a new output current $i_{out2}$ as well as output voltage $V_{out}$ can stabilise at a new output voltage $V_{out2}$.

In particular embodiments, a constant time controller of a switching regulator (e.g., as shown in examples of FIGS. 2, 3A and 4A), when load 16 suffers from a transient change, the control signal can be deactivated earlier than in normal state or operation. This may keep inductor current $i_L$ following the variation tendency of output current $i_{out}$. In this fashion, a fast transient response may be realized, and the ripple on output voltage can be reduced.

Figure 5:
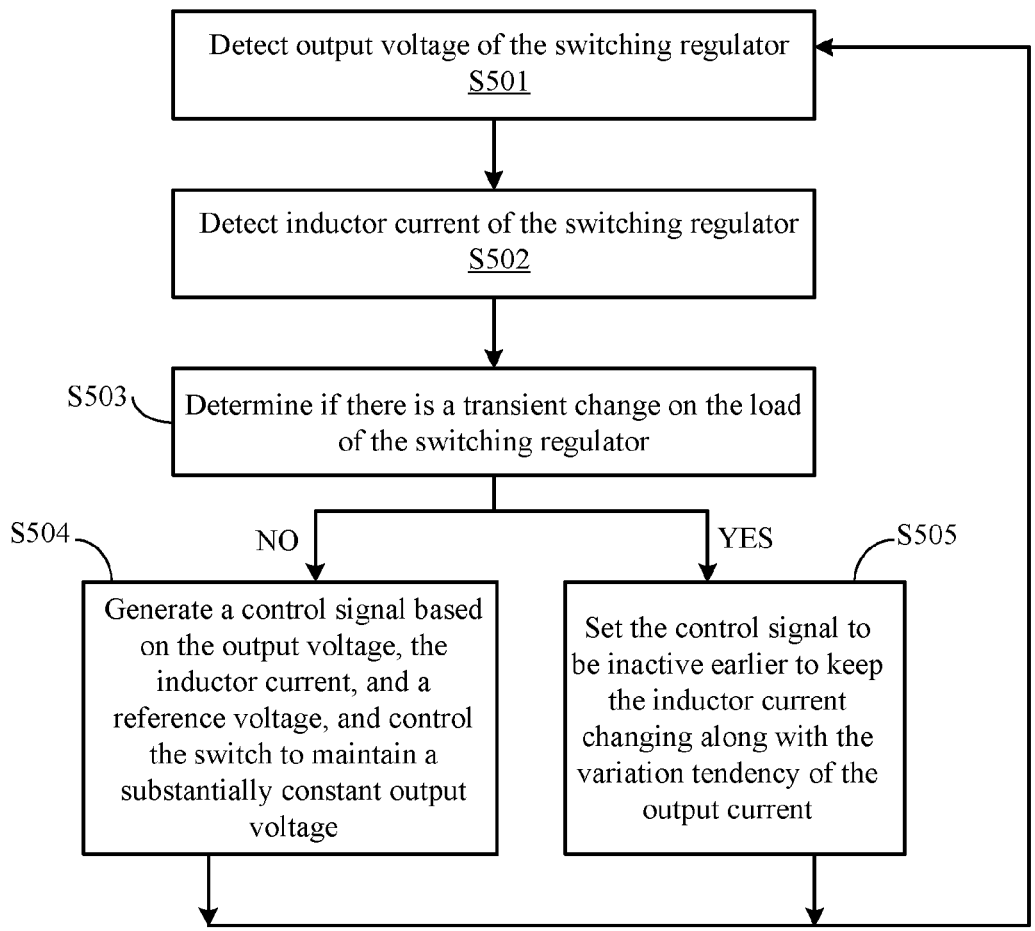
FIG. 5 is a flow diagram of an example constant time controlling method of switching regulator in accordance with embodiments of the present invention.

With reference to FIG. 5, a flow diagram of an example constant time controlling method of a switching regulator in accordance with embodiments of the present invention is shown. This example method can include at S501, detecting an output voltage of a switching regulator. At S502, the inductor current of the switching regulator may be detected. At S503, a determination can be made as to whether there is a transient change on the load of the switching regulator. For example, this detection can be done by utilising the output voltage and the first reference voltage.

At S504, a control signal can be generated according to the output voltage, the inductor current, and the second reference voltage. The switch of the switching regulator can be controlled to keep the output voltage substantially constant when there is no transient change on the load. At S505, the control signal can be deactivated earlier than in normal operation to keep the inductor current changing consistently with the variation tendency of the output current when there is a transient change on the load.

For example, the output voltage can be detected by voltage-dividing resistors in S501, and the inductor current can be detected by a current-voltage converter in S502. For example, a transient change on the load in S503 can be determined by comparing a feedback voltage of the output voltage against the first reference voltage. When the feedback voltage is detected to be less or smaller than the first reference voltage, this may indicate that there is no transient change on the load. In this case, when the feedback voltage is detected to be different from the second reference voltage, and at the same time, if the valley value of the inductor current sense signal reaches the error voltage signal, the control signal can be activated to turn on the switch. After the switch is turned on for a predetermined constant on-time, the switch may be turned off. Then a new operation cycle may be repeated when the inductor current sense signal reaches the error voltage signal again. The output voltage and the output current may be kept substantially constant by the constant on-time control for switching regulator.

However, when the feedback voltage is detected as larger or greater (e.g., in absolute value) than the first reference voltage, it may indicate that the load changes from a relatively heavy load to a relatively light load, and the output current may drop suddenly and the output voltage may rise suddenly. In this case, the control signal may be deactivated earlier to turn off the switch and keep the inductor current changing consistently with the variation tendency of output current, thus realizing a fast transient response.

For example, the transient change on the load in S503 can be determined by comparing a feedback voltage of the output voltage against the first reference voltage. When the feedback voltage is detected to be larger or greater than the first reference voltage, it can indicate that there is no transient change on the load. In this case, when the output voltage is detected to be different from the second reference voltage, and at the same time, if the peak value of the inductor current sense signal reaches the error voltage signal, the control signal can turn off the switch. After the switch is turned off for a constant off-time, the switch may be turned on. Then, a new operation cycle may be repeated when the inductor current sense signal reaches the error voltage signal again. The output voltage and the output current may be kept substantially constant by the constant off-time control for switching regulator.

However, when the output voltage is detected to be smaller than the first reference voltage, it can indicate that the load changes from a relatively light load to a relatively heavy load, the output current may rise suddenly and the output voltage can drop suddenly. The control signal may be deactivated earlier than in a normal state to turn on the switch and keep the inductor current changing consistently with the variation tendency of the output current, thus realizing a fast transient response.

In particular embodiments, when there is a transient change on the load, the control signal can be deactivated earlier than when in a normal state to keep the inductor current changing consistently with the variation tendency of the output current. In this way, a fast transient response may be realized, and the ripple of output voltage may be reduced. In addition, example switching regulators (e.g., as shown in FIGS. 2, 3A and 4A), can further include a driver. The driver may be configured to generate a driving signal $V_G$ for driving the switch of the power stage in accordance with the control signal $V_{ctrl}$.

The foregoing descriptions of specific embodiments of the present invention have been presented through images and text for purpose of illustration and description of the voltage controlled current source circuit and method. They are not intended to be exhaustive or to limit the invention to the precise forms disclosed, and obviously many modifications and variations are possible in light of the above teaching, such as different implementations of the differentiating circuit and enabling signal generator.

The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of controlling a switching regulator, the method comprising:
    a) detecting an output voltage and an inductor current of said switching regulator;
    b) determining if there is a transient change on a load of said switching regulator by using said output voltage and a first reference voltage;
    c) generating a control signal using said output voltage, said inductor current, and a second reference voltage;
    d) controlling, by said control signal having a constant pulse width according to a constant time generator configured to support a constant on-time control mode and a constant off-time control mode, a switch of said switching regulator to maintain said output voltage as substantially constant when no transient change is determined on said load; and
    e) deactivating said control signal by reducing said constant pulse width for a present switching cycle such that said inductor current changes along with a variation tendency of an output current of said switching regulator when a transient change whereby said output voltage transitions from a first voltage to a second voltage is determined on said load, wherein said second voltage is higher than said first voltage for said constant on-time control mode, and said second voltage is lower than said first voltage for said constant off-time control mode.

2. The method of claim 1, wherein said inductor current is reduced for said transient change when said second voltage is higher than said first voltage during said constant on-time control mode.

3. The method of claim 1, wherein said inductor current is increased for said transient change when said second voltage is lower than said first voltage during said constant off-time control mode.

4. The method of claim 1, wherein said constant pulse width is reduced prior to a settling time of said output voltage.

5. The method of claim 1, wherein:
    a) said output voltage is detected by voltage-dividing resistors to generate a feedback voltage; and
    b) said inductor current is detected by an inductor-voltage converter to generate an inductor current sense signal.

6. The method of claim 5, wherein:
    a) when said load is substantially stable, said switch turns on when said output voltage is detected to have deviated from said second reference voltage and when a low value of said inductor current reaches a level of an error voltage signal, wherein said error voltage signal is generated by comparing said feedback voltage against said first reference voltage, and wherein said switch is turned off after being turned on for a constant on-time with said constant pulse width; and b) when said load changes from a heavy load to a light load, said output current drops, and said output voltage is greater than said first reference voltage, said control signal is deactivated earlier than when in a normal state, and said switch is also turned off earlier to reduce said constant pulse width for said present switching cycle, wherein said inductor current decreases and changes consistently with said variation tendency of said output current.

7. The method of claim 5, wherein:

a) when said load is substantially stable, said switch is turned off when said output voltage is detected to deviate from said second reference voltage, and when a peak value of said inductor current reaches an error voltage signal, wherein said error voltage signal is generated by comparing said feedback voltage against said first reference voltage, and wherein said switch is turned on after being turned off for a constant off-time with said constant pulse width; and b) when said load changes from a light load to a heavy load, said output current rises and said output voltage is less than said first reference voltage, said control signal is deactivated earlier than when in a normal state to reduce said constant pulse width for said present switching cycle, and said switch is also turned on earlier, wherein said inductor current increases and changes consistently with said variation tendency of said output current.

8. A controller for a switching regulator, the controller comprising:

a) a constant time generator configured to support a constant on-time control mode and a constant off-time control mode, and to generate a control signal in accordance with an output voltage and an inductor current of said switching regulator, wherein said control signal is a pulse signal having a constant pulse width, said control signal being configured to control a switch of said switching regulator;

b) a transient controller configured to determine if there is a transient change whereby said output voltage transitions from a first voltage to a second voltage on a load of said switching regulator by using said output voltage and a first reference voltage, wherein said second voltage is higher than said first voltage for said constant on-time control mode, and said second voltage is lower than said first voltage for said constant off-time control mode;

c) wherein when there is no transient change on said load, said switch is controlled by said control signal having said constant pulse width according to said constant time generator in order to maintain said output voltage as substantially constant; and d) wherein when there is a transient change on said load, said transient controller is configured to generate a transient control signal to control deactivation of said control signal earlier than when in a normal state by reducing said constant pulse width for a present switching cycle, wherein said inductor current is configured to change consistently with a variation tendency of an output current of said switching regulator.

9. The controller of claim 8, wherein said transient controller comprises:

a) a first comparator configured to compare said feedback voltage against said first reference voltage; and b) a single pulse generator configured to receive an output signal from said first comparator, and to generate a transient control signal when there is a transient change on said load.

10. The controller of claim 9, further comprising:

a) an output voltage controller configured to receive said output voltage, and to generate an error voltage signal by comparing said output voltage against a second reference voltage;

b) an inductor current controller configured to receive an inductor current sense signal and said error voltage signal;

c) said constant time generator being configured to receive said transient control signal, wherein when there is no transient change on said load, said constant time generator is configured to generate a constant time signal, and wherein when there is a transient change on said load, said constant time signal is generated earlier than generated in normal operation; and d) a logic circuit coupled to said inductor current controller and said constant time generator, wherein said logic circuit is configured to generate said control signal.

11. The controller of claim 10, wherein:

a) when said output voltage is less than said first reference voltage and deviated from said second reference voltage, and when a low value of said inductor current reaches a level of said error voltage signal, said switch is configured to be turned on by said control signal, and to be turned off after being on for a constant time with said constant pulse width; and b) wherein when said output voltage is greater than said first reference voltage during a conduction period of said switch, said control signal is configured to be deactivated earlier than in normal operation to reduce said constant pulse width for said present switching cycle.

12. The controller of claim 10, wherein:

a) wherein when said output voltage is greater than said first reference voltage and deviated from said second reference voltage, and a peak value of said inductor current reaches a level of said error voltage signal, said switch is configured to be turned off by said control signal, and to be turned on after being off for said constant time with said constant pulse width; and b) wherein when said output voltage is less than said first reference voltage during a shutdown period of said switch, said control signal is configured to be deactivated earlier than in normal operation to reduce said constant pulse width for said present switching cycle.

13. The controller of claim 8, wherein said constant time generator comprises:

a) a voltage source;

b) a constant current source;

c) a capacitor coupled in series with said constant current source between said voltage source and ground;

d) a first switch configured to be controlled by said transient control signal;

e) a second switch coupled in series with said first switch between said voltage source and said ground, wherein a common node of said first switch and said second switch is coupled with a common node of said constant current source and said capacitor;

f) a second comparator coupled to receive a common node of said constant current source and said capacitor, and a threshold voltage, wherein an output of said second comparator is coupled to said logic circuit; and g) wherein when both of said first switch and said second switch are off, said capacitor is configured to be charged by said constant current source until a voltage on said capacitor reaches said threshold voltage.

14. The controller of claim 10, wherein:

a) voltage-dividing resistors are configured to detect said output voltage, and to generate said feedback voltage; and b) a current-voltage converter is configured to detect said inductor current, and to generate said inductor current sense signal.

15. The controller of claim 10, wherein said logic circuit comprises an RS flip-flop coupled to an output of said inductor current controller at a set terminal, and to an output of said constant time generator at a reset terminal, wherein said RS flip-flop is configured to generate a control signal for controlling said switch.

16. A switching regulator, comprising:

a) the controller of claim 8;

b) a power stage circuit configured to receive an input voltage; and c) a driver coupled to said power stage circuit and said constant time controller, said driver being configured to receive said control signal, and to generate a drive signal to control a switch of said power stage.

17. The switching regulator of claim 16, wherein a topology of said power stage circuit comprises at least one of: buck, boost, and buck-boost.

18. The controller of claim 8, wherein said inductor current is reduced for said transient change when said second voltage is higher than said first voltage during said constant on-time control mode.

19. The controller of claim 8, wherein said inductor current is increased for said transient change when said second voltage is lower than said first voltage during said constant off-time control mode.

20. The controller of claim 8, wherein said constant pulse width is reduced prior to a settling time of said output voltage.

* * * * *